United States Patent [19]

Silletto et al.

[11] Patent Number: 4,595,402
[45] Date of Patent: Jun. 17, 1986

[54] SUSPENSION SYSTEM FOR MOUNTING FILTER BAGS IN A BAGHOUSE

[75] Inventors: John L. Silletto; Francis E. Dahlem, both of Louisville, Ky.

[73] Assignee: Allis-Chalmers Corporation, Milwaukee, Wis.

[21] Appl. No.: 735,043

[22] Filed: May 16, 1985

Related U.S. Application Data

[63] Continuation-in-part of Ser. No. 645,678, Aug. 30, 1984, abandoned.

[51] Int. Cl.⁴ .............................................. B01D 46/02
[52] U.S. Cl. ...................................... 55/378; 55/508; 55/DIG. 26; 248/610
[58] Field of Search ..................... 55/378, 341 R, 493, 55/508, DIG. 26; 248/610

[56] References Cited

U.S. PATENT DOCUMENTS

| 1,281,128 | 8/1918 | Borer | 248/610 |
| 3,429,107 | 2/1969 | Graves | 55/378 |
| 4,123,027 | 10/1978 | Huntington | 55/378 X |
| 4,217,117 | 8/1980 | Syverson | 55/378 X |
| 4,481,022 | 11/1984 | Reier | 55/378 |

Primary Examiner—Charles Hart
Attorney, Agent, or Firm—Donald C. McGaughey

[57] ABSTRACT

A suspension system for mounting filter bags in a baghouse is disclosed featuring a pretensioned spring having an amount of pretension which will prevent spring displacement when subjected to a first loading force which is the combined weight of the filter bag and a predetermined dust load therein but will permit momentary spring displacement when it is subjected to a second loading force which is the sum of the first loading force and an additional loading force imposed on the filter bag during a cleaning cycle.

6 Claims, 6 Drawing Figures

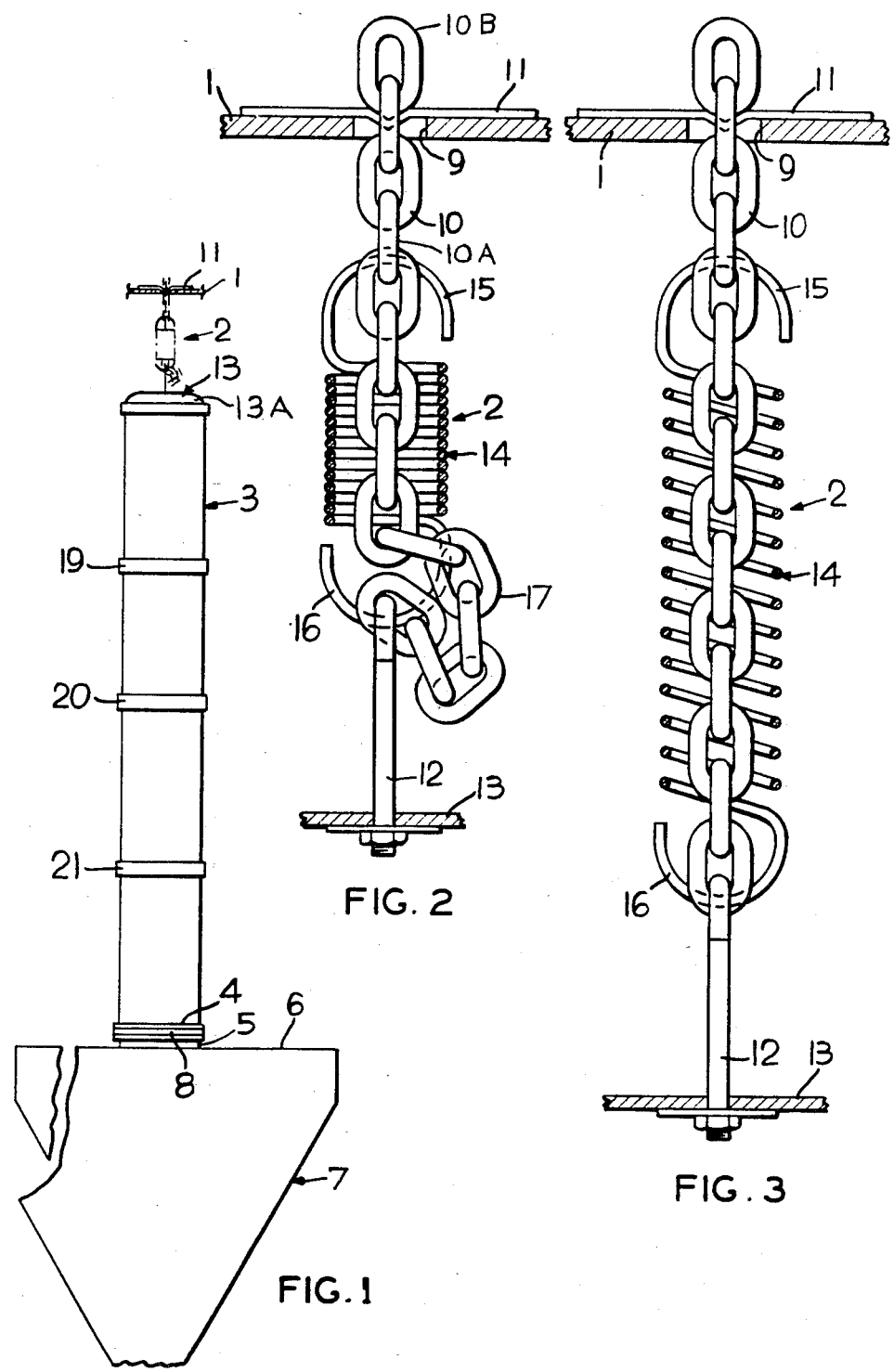

SUSPENSION SYSTEM FOR MOUNTING FILTER BAGS IN A BAGHOUSE

This application is a continuation-in-part of U.S. patent application, Ser. No. 645,678 filed Aug. 30, 1984 and now abandoned.

BACKGROUND OF THE INVENTION

This invention relates to a baghouse having filter bags therein for separating solid particles from a dust laden gas stream and more particularly to an improved individual suspension system for mounting each filter bag in the baghouse.

Typical baghouses and suspension systems for mounting the filter bags therein are shown in U.S. Pat. Nos. 3,881,673; 4,123,027; 4,217,117 and 4,481,022.

A baghouse, as is well known, comprises a gas tight housing having a gas impervious floor plate dividing the baghouse into a dirty gas chamber having a dirty gas inlet and a clean gas chamber having a clean gas outlet. The floor plate has a series of apertures which open into a dust receiving hopper or a series of hoppers which form part of the dirty gas chamber.

A plurality of filter bags, usually tubular and constructed of a fragile glass fabric, are suspended from a supporting framework in the clean gas chamber. The bottom of each filter bag is open and is secured in sealed relation around an associated aperture in the floor plate. The top end of each filter bag is closed and attached to the framework in the clean air chamber at the top of the housing by means of some type of spring suspension system which must be vertically extended to make the filter bags taut when they are installed.

A large baghouse installation could include 32 baghouses that are each 33 feet long, 18 feet wide, 80 feet high, have as many as 312 filter bags each 34 feet long by 12 inches in diameter, and process 2,000,000 cubic feet per minute (CFM) of dirty gas. The current cost of such a baghouse per se, can be $25,000,000. Baghouses have been in use for more than forty years and the unsolved problem is how to reduce the size of the baghouse and thus significantly reduce its cost without reducing its CFM capacity or its operational efficiency.

In each of the mentioned patents, the top end of each filter bag is connected to an internal supporting framework by an individual spring suspension system which is, as previously described, of the type which must be vertically lengthened when the filter bag is initially installed to place and maintain the filter bag under tension. Proper tension is necessary to prevent folding and creasing of the filter bag which reduces collection efficiency and causes premature failure of the fragile glass fabric. In U.S. Pat. Nos. 3,881,673 and 4,217,117, a linkage is vertically extended to place an associated spring in compression. In U.S. Pat. No. 4,123,027 the spring itself is vertically extended. In U.S. Pat. No. 4,481,022, the suspension system uses a helical coil torsion spring unit having angularly extending side arms. The helical coil is tensioned by increasing the angle between the spring side arms which extends the vertical length of the suspension system when the filter bag is installed.

In the prior art when a baghouse is designed, the increase in vertical length of the spring suspension system required for initial tensioning of the filter bags is calculated. Then the internal vertical height of the baghouse is increased by the length of vertical travel required at installation by the spring suspension system. In the past it was thought necessary that the baghouse height be increased beyond the theoretical minimum height to accommodate the increase in length of the suspension system because it has not been possible to eliminate the need for vertical travel in the spring suspension system.

This need for vertical travel exists because in operation, dust laden gas enters the dirty air chamber, travels upward and passes through the filter bags and clean gas outlet. Dust is trapped on the inside surfaces of the filter bags and builds up into a filter cake of dust which increases the weight of the filter bag and its resistance to gas flow. The filter bags must be cleaned periodically, usually every two to six hours depending on conditions. Cleaning is accomplished during a cleaning cycle by pulsing air in a reverse direction through the filter bag, flowing air in a reverse direction through the bags, shaking the bags or a combination of these methods. In each cleaning method, the spring suspension system must be allowed to extend to permit a limited collapse of the filter bag. If limited collapse is not permitted, the filter cake will not be completely dislodged and the filter bag will be only partially cleaned. If the filter bag is allowed to collapse too much, the bag will develop folds that close off the interior opening at the bottom of the bag and either prevent the filter cake from falling through to the hopper or leave an unreasonably narrow opening at some region or regions inside the bag which increases the velocity of the reverse gas stream in such narrowed regions. The dust in the gas stream makes it very abrasive. The high velocity abrasive gas stream will quickly wear through the filter bag fabric in the narrowed regions which experience the high velocity gas flow.

Therefore, the problem which has not been satisfactorily solved in the past is how to design a filter bag suspension system to always keep each filter bag taut that will:

(1) not require any extension of its vertical length when the filter bag is initially installed, (2) not require any extension of its vertical length as the weight of the filter bag increases due to buildup of dust filter cake to a maximum dust loaded weight, and (3) permit momentary vertical extension during a cleaning cycle to allow a predetermined amount of filter bag collapse for efficient cleaning so that the vertical height of the baghouse need not be unnecessarily increased as it has in prior art designs but can be kept to a theoretical minimum to significantly reduce cost.

SUMMARY OF THE INVENTION

In order to permit an overall reduction in the internal vertical length of the baghouse, an improved spring suspension system is disclosed which features a pretensioned spring. One example of a pretensioned spring is a helical coil tension spring which is manufactured by partly overlapping the spring wire as it is fed into the coiling machine to produce a contracting tension in the coils which means that in an installed condition, a predetermined amount of load must be applied to the spring before spring displacement occurs which is when the spring coils start to separate.

The improved pretensioned spring suspension system permits each bag to be placed under an amount of axial tension which will cause the filter bag to be stretched taut plus an additional axial force to compensate for the weight of a predetermined amount of dust buildup in the filter bag. Therefore, for each installation, a pretensioned spring must be selected that has a specified amount of pretension built into the spring at its manufacture, that is (1) high enough to prevent coil displacement when subjected to a first loading force exerted by the combined weight of the filter bag and a predetermined maximum dust load in the filter bag during normal dust filtering operation, but (2) low enough to permit momentary displacement of the coils of the spring when subjected to a second loading force which is the sum of the first loading force and an additional loading force imposed by the contraction of the filter bag during the cleaning cycle.

It is an object of this invention to provide an improved suspension system for mounting a filter bag in a baghouse which will not require the baghouse to be oversized in internal vertical height.

It is a further object of this invention to provide an improved suspension system which will permit the baghouse to be designed smaller in size than prior baghouses and, thus, be lower in cost without reducing gas flow capacity or efficiency of operation.

BRIEF DESCRIPTION OF THE DRAWINGS

The preferred embodiment of this invention is illustrated.

FIG. 1 illustrates a filter bag suspended in a baghouse;

FIG. 2 is an enlarged view of the suspension system for the filter bag;

FIG. 3 is an enlarged view of the suspension system in the momentary extended position which occurs during the cleaning cycle;

FIG. 5 is a fragmentary view showing the filter bag fastened to a cover, reinforcing rings sewn in the filter bag, and a cuff clamped on a collar.

DETAILED DESCRIPTION OF THE INVENTION

Figure 6:
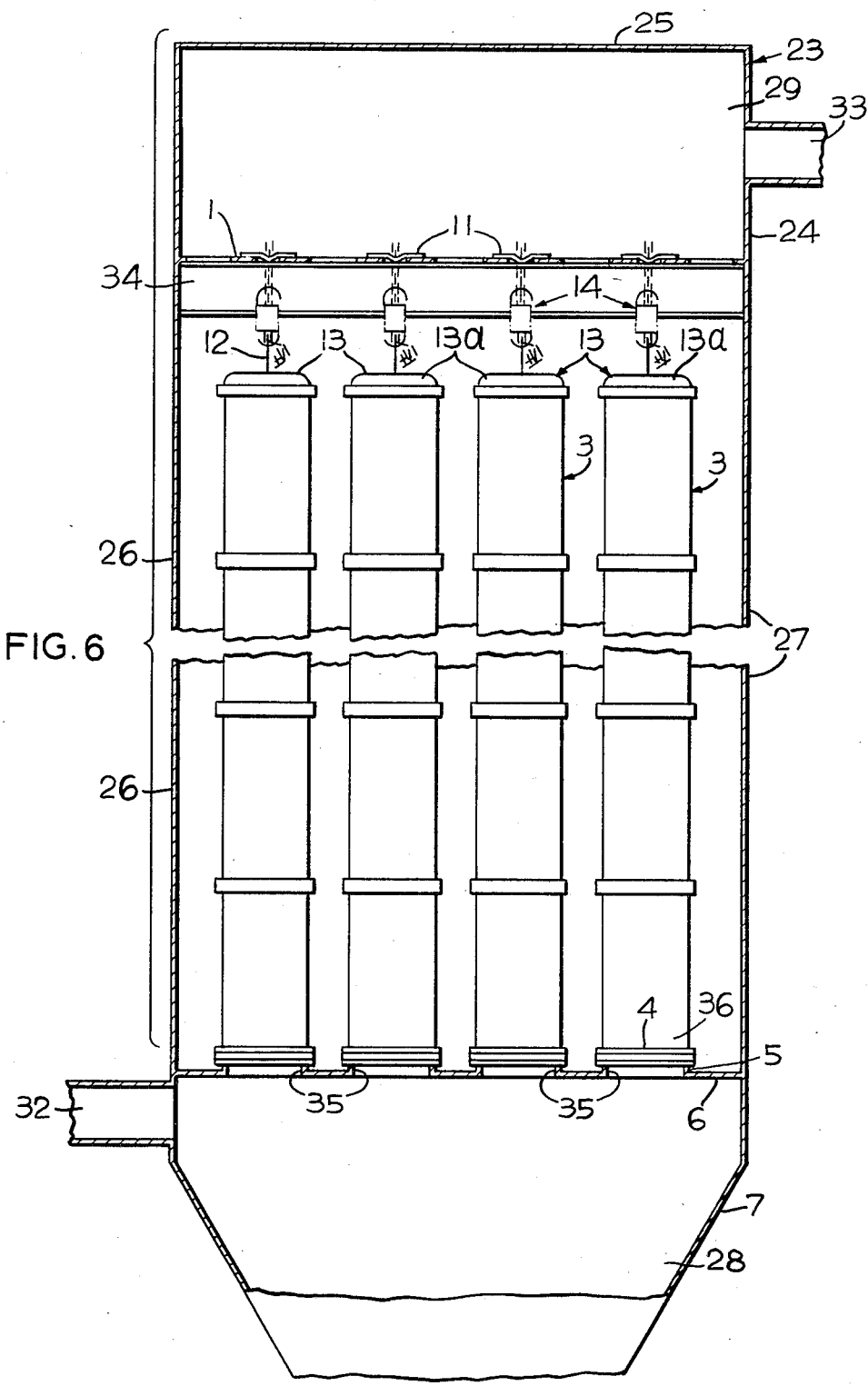
FIG. 6 is a partial cross section side view of a baghouse showing the filter bags mounted therein by the suspension system.

Referring to FIG. 6, the baghouse 23 comprises a gas tight housing 24 having a top wall 25, side walls 26, 27 and a floor plate 6 dividing the baghouse into a dirty gas chamber 28 and a clean gas chamber 29. The dirty gas chamber 28 includes a hopper 7 and has a dirty gas inlet 32. The clean gas chamber 29 has a clean gas outlet 33 and a filter bag support structure 1 in the form of a plurality of transverse channel members 34 which are supported by the walls 26, 27 of the housing 24. The floor plate 6 has a plurality of openings 35 and a vertically upstanding collar 5 is mounted around each floor plate aperture. A plurality of filter bags 3 are mounted in the clean air chamber 29 of the baghouse 23.

As all of the filter bags 3 are constructed, mounted and operated in the baghouse in the same way, only one filter bag, its mounting and function will be described. The filter bag 3 is preferably tubular in form and constructed out of a glass fabric. The filter bag has a closed end 13 at the top thereof and an open end 36 at the bottom thereof which terminates in a bag cuff 4. The closure at the top end 13 is in the form of a bag cap 13A having a J-Hook 12 (FIG. 5) of as short a length as possible for use in mounting the filter bag in the baghouse 23 as will be further explained. The bag cap 13A is secured to the filter bag by a clamp 30 as shown in detail in FIG. 5. The cuff 4 at the open end 36 of the filter bag 3 is placed over the collar 5 and retained thereon by a clamp 8 thus securing the open end in gas tight relation around the aperture 35 in the floor plate 6. Bag support rings 19, 20, 21 and a reinforcing anticollapse ring 31 are sewn into the filter bag at the locations shown in FIGS. 4 and 5.

The closed top end 13 of the filter bag is secured to the channel member 34 by a suspension system 2 that comprises a pretensioned resilient member in the form of pretensioned helical tension spring 14 best shown in an installed and normal operating condition in FIG. 2. The pretensioned spring 14 has first and second ends 15, 16 and could be connected directly between the channel member 34 and the top end 13 of the bag 3. However, as a practical matter it is preferable to hook the second end 16 into the J-Hook 12 and to close couple the first or upper end 15 of the spring 14 to the channel member 34 through some type of vertically adjustable member such as a link chain 10. One end, link 10A of the chain 10, is connected to spring end 15. The other end, 10B of the chain 10, is inserted through an opening 9 in the channel 34, pulled upwardly and a pin 11 inserted in any link as needed to set a predetermined tension on the filter bag which will hold it taut, even when loaded with dust, without causing displacement of the spring 14. The pretensioned spring 14 is selected to have an amount of pretension which is:

(1) high enough to prevent spring displacement when the spring 14 is subjected to a first loading force exerted by the combined weight of the filter bag 3 and a predetermined maximum dust load that the filter bag 3 can contain before cleaning is necessary during normal dust filtering operation, but (2) low enough to permit momentary displacement of said spring 14 when subjected to a second loading force which is the sum of the first loading force and an additional loading force imposed by said contraction of said filter bag 3 during the cleaning cycle. Thus, the amount of pretension is of a high enough value that the total weight of the filter bag 3 and the maximum permitted operational dust load therein will not cause the spring coils to displace or separate but will place the spring 14 at the threshold of displacement so that the additional axial load imposed when the filter bag 3 is forced to contract during the cleaning cycle will cause the spring to momentarily displace and permit the partial collapse of the filter bag necessary for cleaning.

The filter bag suspension system 2 is shown in a normal operating position in FIG. 1. Dust laden gas enters the dirty gas chamber 28 through dirty gas inlet 32, travels upward through openings 35 and passes into the filter bags 3. The filter bags 3 are porous allowing the gas to pass therethrough into the clean gas chamber 29 and out clean gas outlet 33. The dust is trapped on the inside surfaces of the filter bag 3 and builds up as a filter cake which may become encrusted depending on moisture conditions. The spring 14 could have either a high or a low spring constant. The spring 14 is selected to preferably have a low spring constant and with an amount of pretension that will prevent its displacement when subjected to the combined weight of the filter bag and the determined maximum weight of the dust the filter bag should be allowed to contain before cleaning. This combined weight will place spring 14 at the threshold of displacement.

Figure 4:
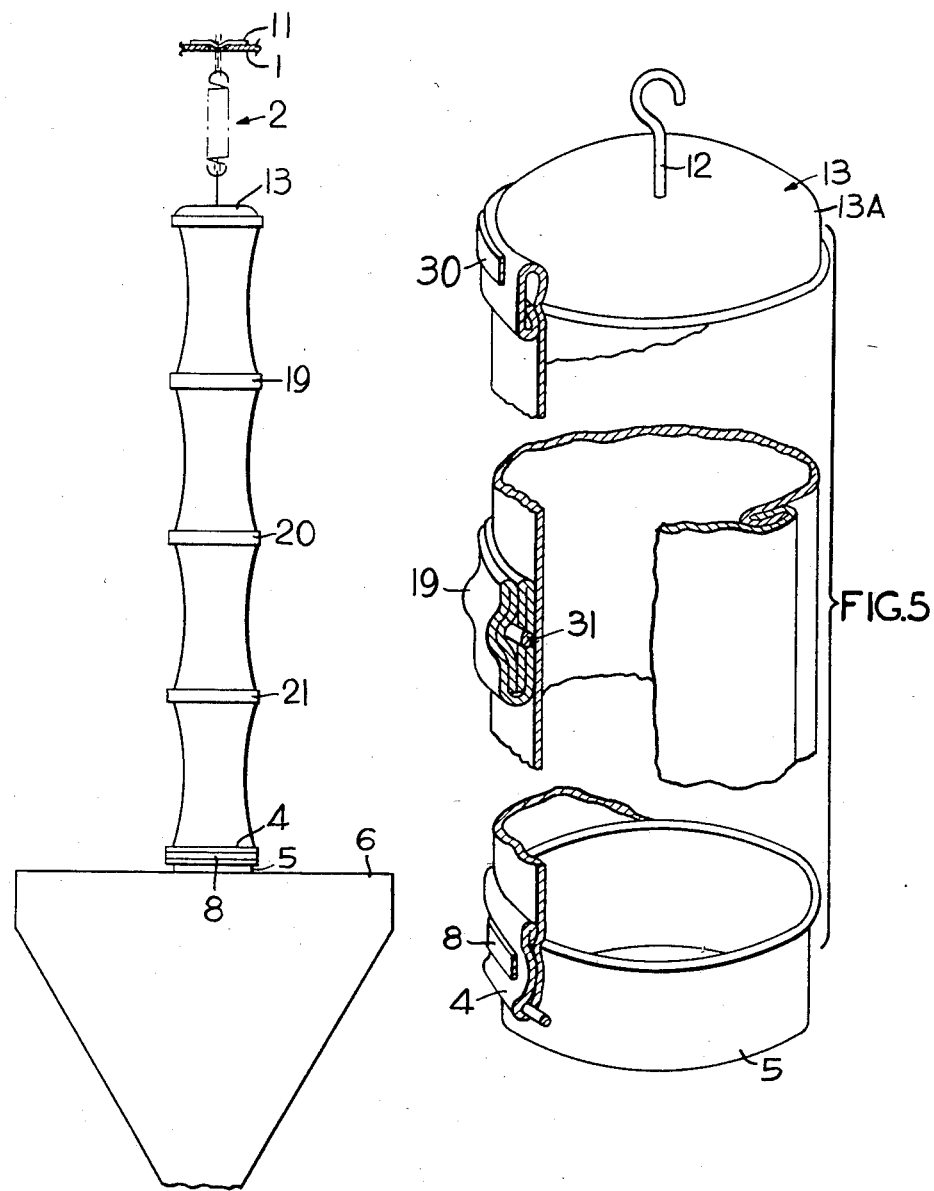
FIG. 4 is a view of the filter bag during the cleaning cycle.

During the cleaning cycle, the filter bag will be subject to any one of a number of known cleaning methods, as for example, reverse air pulsing, which will shorten the axial length of the filter bag 3 a predetermined amount. With reverse air pulsing, a back pressure is created across the span of fabric between rings 19, 20, 21, end cap 13 and collar 4 to cause a catenary action as shown in FIG. 4. The catenary action is necessary to distort the fabric and cause proper dislodging of the filter cake from the fabric. Because the spring 14 is at the threshold of displacement due to the combined weight of the filter bag and the dust contained therein, the back pressure will create sufficient additional axial force to cause the spring to momentarily displace as shown in FIG. 3. As discussed above, the spring 14 preferably has a low spring constant, which will permit it to displace at a lower reverse air pressure than would be required if a spring with a higher spring constant is selected.

During cleaning, the filter bag 3 must not be allowed to contract beyond a predetermined amount which would permit an overcollapse of the filter bag 3. Overcollapse narrows the interior area at some regions in the bag 3 causing a high velocity flow of abrasive dust laden gases in the narrowed regions which will abrade through the fabric and destroy the filter bag 3. Overcollapse can even be so great as to permit the filter bag 3 to sag sufficiently to close or choke off the opening 35 in the floor plate 6 thus preventing the dust and filter cake from dropping into the hopper 7. Under such conditions when normal gas flow resumes, the dust is redeposited in the filter bag 3. To prevent overcollapse, any suitable stop member may be connected between the filter bag 3 and the housing 24 or channels 34 to limit filter bag contraction. In the preferred embodiment, the chain 10 is arranged to serve a dual function. As previously discussed, chain 10 adjustably connects the filter bag 3 to the channel member 34. In addition, the chain 10 can be provided with a slack portion 17 which is connected between link 10A and J-Hook 12 as shown in FIG. 2. The slack portion constitutes a flexible stop member to limit the axial contraction of the filter bag during the cleaning cycle. The catenary action causes the filter bag to collapse until the slack 17 in chain 10 is taken up as shown in FIG. 3.

For example, the use of the present invention in a baghouse would permit at least a four inch reduction in height amounting to at least a one percent reduction in baghouse size. These size reductions will result in cost savings of one-half to three-quarters of a percent depending on the capacity of the baghouse. With reference to the large baghouse discussed hereinbefore in the Background of the Invention, a one-half percent cost saving would reduce the cost of that baghouse by $125,000.

The foregoing detailed description of the invention has disclosed a suspension system for use in mounting filter bags in a baghouse. The best mode for practicing the invention which has been disclosed may be modified by those skilled in the art without departing from the basic inventive concept defined in the following claims.

The embodiments of the invention in which an exclusive property or privilege is claimed are defined as follows:

1. A suspension system for use in mounting filter bags in a baghouse of the type including; a gas tight housing, a floor plate having apertures therein, mounted in said housing to divide said housing into a dirty gas chamber having a dirty gas inlet and a clean gas chamber having a clean gas outlet to permit a flow of gas through said housing, a plurality of said filter bags mounted in said clean gas chamber with each filter bag having a closed end and an open end, said open end of each bag secured in gas tight relation around one of said apertures, and a filter bag cleaning means of the type which causes the filter bags to periodically contract a limited amount in overall length during a cleaning cycle; wherein the improvement in said suspension system comprises a pretensioned resilient member presenting first and second ends, said first end connected to said closed end of said filter bag and said second end connected to said baghouse housing to place said filter bag in tension, said resilient member having an amount of pretension which is, (1) high enough to prevent displacement thereof and cause the filter bag to remain taut when subjected to a first loading force exerted by the combined weight of said filter bag and a predetermined maximum dust load in said filter bag during normal dust filtering operation, but (2) low enough to permit momentary displacement of said resilient member when subjected to a second loading force which is the sum of said first loading force and an additional loading force imposed by said contraction of said filter bag during said cleaning cycle.

2. A suspension system as set forth in claim 1 wherein said resilient member is a pretensioned helical tension spring.

3. A suspension system as set forth in claim 2 having a flexible stop member of sufficient length connected between said baghouse housing and each of said filter bags to provide a slack portion when said filter bag is in a normal operating position, and wherein said helical tension spring is connected across said slack portion.

4. A suspension system as set forth in claim 3 wherein said housing includes an internal support structure having an opening for receiving said flexible stop member therethrough and a pin passing through any one of a series of apertures in said flexible member and when so installed, resting on said support member to retain said flexible member in a position selected to apply predetermined tension to said filter bag without displacement of said spring.

5. A suspension system as set forth in claim 3 wherein said flexible stop member is a link chain, and wherein said helical tension spring is selectively connected between two individual links of said chain that are spaced far enough apart to provide a slack portion therebetween, said slack portion limiting the amount of displacement of said spring during said cleaning cycle.

6. A suspension system as set forth in claim 4 wherein said flexible stop member is a link chain, and wherein said helical tension spring is selectively connected between two individual links of said chain that are spaced far enough apart to provide a slack portion therebetween, said slack portion limiting the amount of displacement of said spring during said cleaning cycle.

* * * * *